(12) United States Patent
Yano et al.

(10) Patent No.: US 8,082,325 B2
(45) Date of Patent: Dec. 20, 2011

(54) DATA STORING SYSTEM USING NETWORK

(75) Inventors: Yoshihiro Yano, Tokyo (JP); Fukio Handa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/156,846

(22) Filed: Jun. 9, 2011

(65) Prior Publication Data

US 2011/0238729 A1    Sep. 29, 2011

Related U.S. Application Data

(62) Division of application No. 10/582,692, filed as application No. PCT/JP2004/019670 on Dec. 21, 2004, now abandoned.

(30) Foreign Application Priority Data

Dec. 24, 2003    (JP) .................................. 2003-426240

(51) Int. Cl.
*G06F 15/16*    (2006.01)
(52) U.S. Cl. ........................................ 709/218; 709/211
(58) Field of Classification Search .................. 709/211, 709/218
See application file for complete search history.

(56) References Cited

U.S. PATENT DOCUMENTS

| 5,598,524 A | 1/1997 | Johnston et al. |
| 6,205,580 B1 | 3/2001 | Hirose |
| 6,711,594 B2 | 3/2004 | Yano et al. |
| 2002/0004816 A1* | 1/2002 | Vange et al. ............. 709/202 |
| 2002/0138504 A1 | 9/2002 | Yano et al. |
| 2004/0049636 A1 | 3/2004 | Campbell et al. |
| 2004/0054698 A1 | 3/2004 | Iwami et al. |

FOREIGN PATENT DOCUMENTS

| JP | 2002-73383 A | 3/2002 |
| JP | 2002-207629 A | 7/2002 |
| JP | 2003-131923 A | 5/2003 |
| JP | 2003-256144 A | 9/2003 |
| JP | 2003-345643 A | 12/2003 |
| WO | 01/46808 A1 | 6/2001 |
| WO | 2005/071548 | 8/2005 |
| WO | 2005/078587 | 8/2005 |
| WO | 2005/081114 | 9/2005 |
| WO | 2005/081120 | 9/2005 |

* cited by examiner

*Primary Examiner* — Carl Colin
*Assistant Examiner* — Peter Shaw
(74) *Attorney, Agent, or Firm* — Ladas & Parry LLP

(57) ABSTRACT

An agent program (12) installed in a terminal device (10) is used to upload data, which are to be stored, to a data storage device (100) via a first network (N1). Data uploaded to a first data storage unit (110) are stored therein as they are. On the other hand, data uploaded to a second data storage unit (120) are transferred, by the function of a data transferring unit (130), to any of external storage sites (210-230) via a second network (N2), and management information, which includes the URL of the storage site that is the transfer destination, is stored into an IC card (11). When the data stored in the data storage unit (120) are required, the management information in the IC card (11) is given to the data transferring unit (130) and the relevant data are forwarded from the storage site that was the transfer destination to the data storage unit (120) and then downloaded to the terminal device (10). The limit of the storage capacity can thereby be overcome and damages due to viruses can be suppressed.

11 Claims, 3 Drawing Sheets

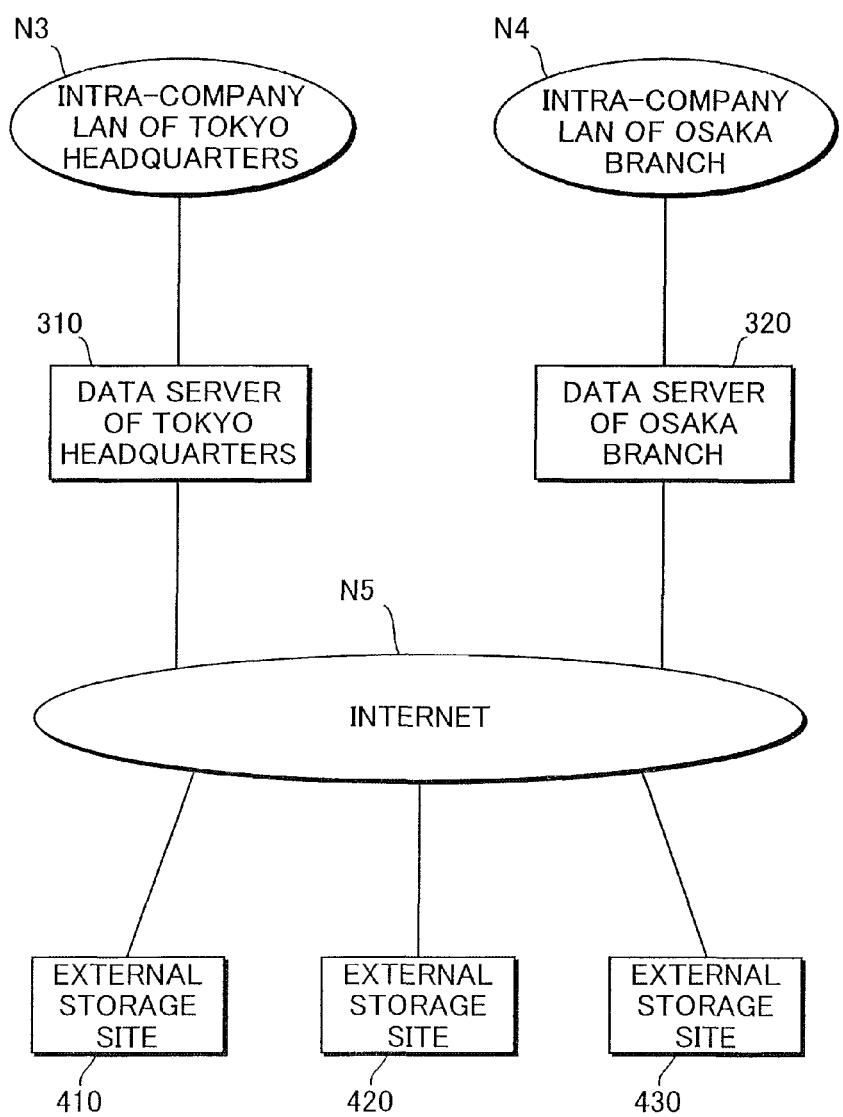

DATA STORING SYSTEM USING NETWORK

RELATED APPLICATION

This is a divisional of application Ser. No. 10/582,692 filed on Feb. 5, 2007 now abandoned, which is International Application PCT/JP04/19670 filed on Dec. 21, 2004, which designated the U.S., claims the benefit thereof and incorporates the same by reference.

TECHNICAL FIELD

This invention relates to a data storage system using network and particularly relates to a data storage system enabling storage of data from arbitrary terminal devices into arbitrary sites via networks.

BACKGROUND ART

Data storage devices that are connected via networks are used for safe storage of data prepared by a personal computer, etc. Such a network connected type data storage device is generally referred to as "NAS" (Network Attached Storage) and is widely used for backing up data and other applications due to enabling access from an arbitrary personal computer connected to networks and enabling handling with operability equivalent to a data storage process in a built-in disk drive device. Also in cases where the same data are to be used among a plurality of operators, cooperative work can be performed using the NAS as a storage site in common for the data.

In order to improve security and safety, U.S. Pat. No. 6,711,594 discloses a distributed data archiving device that can divide a single data file into a plurality of partition files and store these partition files respectively at different storage sites.

Though a general, conventional data storage system using network provides the merit of enabling data to be deposited and withdrawn from arbitrary terminal devices connected to networks, there is a limit to the physical storage capacity. Thus, when requests for storing large amounts of data are made from numerous terminal devices connected to the networks, situations may occur wherein the limit of the storage capacity is exceeded and the requests cannot be accommodated. Though as a countermeasure, hard disk devices and other hardware resources having adequate storage capacities can be secured in view of storage capacity demands that may arise in the future, it may not actually be possible to take adequate measures due to reasons of cost. Also, as a new problem of data storage devices using network, damages due to computer viruses have been increasing in recent years, and in cases where a stored data file is infected by a virus, unpredicted damage may spread via the networks.

An object of this invention is to provide a data storage system using network, with which the limits of storage capacity can be overcome as needed and yet with which damages due to computer viruses can be suppressed.

DISCLOSURE OF INVENTION (1) The first feature of the present invention resides in a data storage system using network, having functions of storing data sent from a terminal device via a network and returning saved data via a network in accordance with a request from a terminal device, the data storage system comprising:
a removable storage medium, installable to a terminal device; storing means, built into the terminal device; and a data storage device, connected to the terminal device via a first network;

the data storage device having a first data storage unit, a second data storage unit, and a data transferring unit, the storing means having functions of performing, based on an instruction of an operator, a data deposition process of uploading data to be deposited to the data storage device via the first network and a data withdrawal process of downloading data to be withdrawn from the data storage device via the first network, wherein, in performing the data deposition process, the data to be deposited are uploaded to one of either the first data storage unit or the second data storage unit in accordance with the operator's selection, the data transferring unit having functions of performing a data stocking process, whereby, when data to be deposited have been uploaded to the second data storage unit by the data deposition process, the data to be deposited are forwarded to an external storage site, accessible from the data storage device via a second network, the data to be deposited stored in the second data storage unit are deleted, and management information, including information specifying the external storage site, is sent to a terminal device that is executing the data deposition process, and a data delivery process, whereby, when a request to download data to be withdrawn from the second data storage unit is made by the data withdrawal process, management information is received from a terminal device that is executing the data withdrawal process, data stored in an external storage site specified by the received management information are forwarded to the second data storage unit, and the data in the second data storage unit are deleted upon being downloaded, and the storing means furthermore having functions of executing a process of storing, as an execution result of the data deposition process, management information sent from the data storage device as "management information concerning a data to be deposited" into the removable storage medium and a process of sending, in executing the data withdrawal process, "management information concerning a data to be withdrawn" that had been stored in the removable storage medium to the data storage device.

(2) The second feature of the present invention resides in a data storage system using network according to the first feature, wherein:

the data transferring unit has functions of preparing and saving a list of respective individual data for which the data stocking process has been completed and presenting the list to a terminal device that performs the data withdrawal process, and the storing means has a function of providing to the data transferring unit a request to download specific data, selected from the list by a selection operation by an operator, in performing the data withdrawal process.

(3) The third feature of the present invention resides in a data storage system using network according to the first or second feature, wherein:

the storing means has a function of displaying the first data storage unit and the second data storage unit as folders on a display screen of a terminal device and performs the data deposition process or the data withdrawal process based on an instruction operation, provided from an operator, for moving data to a folder or from a folder.

(4) The fourth feature of the present invention resides in a data storage system using network according to the third feature, wherein:

the data transferring unit, in performing the data delivery process, stores data to be withdrawn, which had been forwarded from an external storage site, into a folder corresponding to the second data storage unit and then downloads said data.

(5) The fifth feature of the present invention resides in a data storage system using network according to the first to fourth features, wherein:

data transferring unit performs, after completion of the data stocking process or the data delivery process, a process of deleting management information used in the completed process from inside the data storage device.

(6) The sixth feature of the present invention resides in a data storage system using network according to the first to fifth features, wherein:

the data transferring unit has a function of sending, after completion of the data stocking process, an e-mail indicating, to a terminal device, completion of a storage of data to be deposited.

(7) The seventh feature of the present invention resides in a data storage system using network according to the first to sixth features, wherein:

the storing means has a function of designating an external storage site in performing the data deposition process by uploading data to be deposited to the second data storage unit, and the data transferring unit forwards the data to be deposited to the designated external storage site.

(8) The eighth feature of the present invention resides in a data storage system using network according to the first to seventh features, wherein:

as information for specifying an external storage site, a URL of the external storage site is used.

(9) The ninth feature of the present invention resides in a data storage system using network according to the first to eighth features, wherein:

the data transferring unit, in performing the data stocking process, performs a process of dividing data to be deposited into a plurality of partition files and forwarding the respective individual partition files to different storage sites and a process of preparing management information that specify the plurality of storage sites, and, in performing the data delivery process, restores an original data by unifying the respective partition files stored in the plurality of storage sites specified by the management information and downloads the restored data as data to be withdrawn.

(10) The tenth feature of the present invention resides in a data storage system using network according to the ninth feature, wherein:

the data transferring unit, in performing the data stocking process, performs a process of preparing management information including information indicating a dividing method that is carried out, and, in performing the data delivery process, executes a unifying process that is in accordance with a method included in the management information.

(11) The eleventh feature of the present invention resides in a data storage system using network according to the first to tenth features, wherein:

the data transferring unit, in performing the data stocking process, performs an encryption process on data to be deposited, a process of forwarding encrypted data to an external storage site, and a process of preparing management information including information indicating a method of the encryption process, and, in performing the data delivery process, executes a decryption process that is in accordance with a method included in the management information.

(12) The twelfth feature of the present invention resides in a data storage system using network according to the first to eleventh features, wherein:

a plurality of data storage devices are provided and data, stored in any of predetermined storage sites, are enabled to be downloaded to a terminal device via any of the data storage devices.

(13) The thirteenth feature of the present invention resides in a data storage system using network according to the first to twelfth features, wherein:

the storing means is realized by program installed in a computer making up the terminal device and an IC card is used as the removable storage medium.

(14) The fourteenth feature of the present invention resides in a data storage system using network according to the first to thirteenth features, wherein:

a LAN is used as the first network and the internet is used as the second network.

(15) The fifteenth feature of the present invention resides in preparing a program to make a computer function as the storing means or the data transferring unit of the data storage system using network according to the first to fourteenth features and recording this program into a computer readable medium.

As described above, with this invention's data storage system using network, by selecting between two types of data storage units, a mode, which enables high-speed deposition and withdrawal, or a mode, which overcomes the limits of storage capacity and can yet suppress damages due to computer viruses, can be selected arbitrarily and used according to need.

BRIEF DESCRIPTION OF DRAWINGS

FIG. 4 is a block diagram showing an operating state of a data storage system using network of a modification example of this invention.

BEST MODE FOR CARRYING OUT THE INVENTION

This invention shall now be described based on the illustrated embodiments.

<<<Section 1. Basic Embodiment>>>

Figure 1:
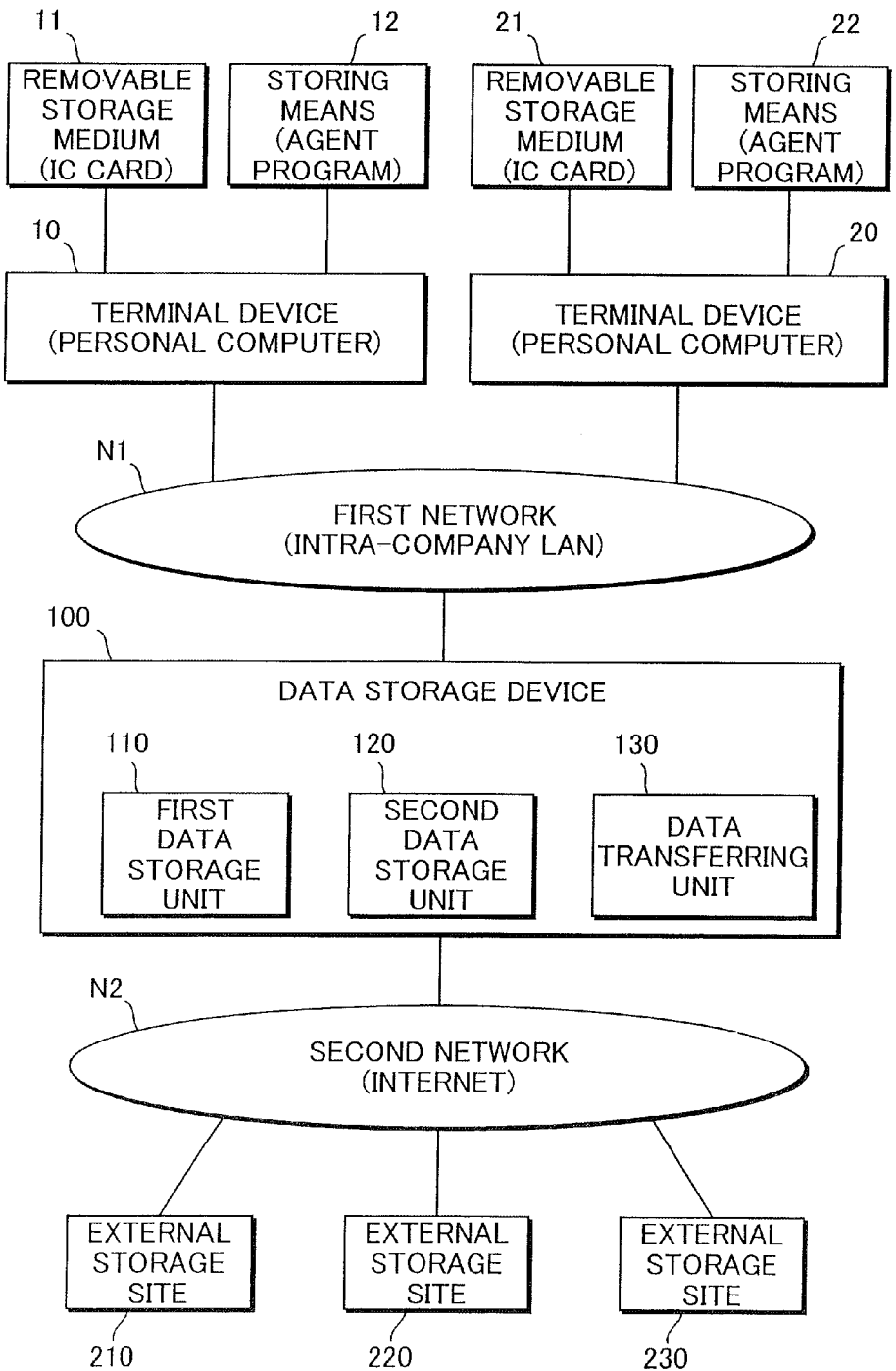
FIG. 1 is a block diagram showing an operating state of a data storage system using network of an embodiment of this invention.

FIG. 1 is a block diagram showing an operating state of a data storage system using network of an embodiment of this invention. Though with this embodiment, an example wherein an intra-company LAN is used as a first network N1 and the internet is used as a second network N2 shall be described, the respective networks do not necessarily have to be an intra-company LAN and the internet. However, in terms of practical use, the case of using the network forms of this example will probably be employed most generally in putting this invention into practice. Also, though for the sake of description, an example shall be described wherein two terminal devices 10 and 20, arranged from computers, are connected to first network N1, in actuality, a larger of number of terminal devices will be connected to first network N1. The terminal devices connected to first network N1 do not necessarily have to be computers, and any device, such as a cell phone or PDA device, may be used as a terminal device as long as it incorporates a computer with data processing functions.

Data storage device 100, shown in FIG. 1, is the central component of the data storage system of this invention and is a data storage system having the functions of storing data sent from terminal devices 10 and 20 via first network N1 and returning stored data via first network N1 in response to requests from terminal devices 10 and 20. The basic functions of this data storage device 100 are the same as those of a general, conventional NAS (Network Attached Storage). As mentioned above, a NAS can be used as a data storage site equivalent to a disk drive device built into a personal computer or other terminal device and is widely used for data backup and other applications.

In the present Description, "data" shall refer not only to so-called data, such as text data, image data, audio data, etc., but widely to digital data in general, including programs, etc. Also, for the sake of description, with this Description, a task of uploading data from terminal devices 10 and 20 and storing the data in data storage device 100 shall be referred to as the "data deposition process" and a task of oppositely downloading data, stored in data storage device 100, to terminal devices 10 and 20 shall be referred to as the "data withdrawal process." An operator can use terminal device 10 to perform the data deposition process of uploading and storing arbitrary data into data storage device 100 and can use the other terminal device 20 to perform the data withdrawal process of downloading such stored data.

A first characteristic of this invention's data storage system is that two types of data storage units, that is, a first data storage unit 110 and a second data storage unit 120 are provided in data storage device 100 and a data transferring unit 130, for performing transfer of data stored in second data storage unit 120, is furthermore provided. Here, both first data storage unit 110 and second data storage unit 120 are arranged from hard disk drive devices or other storage devices and, from the standpoint of hardware, do not differ in being devices having the function of storing data.

However, there is a large difference in terms of the essential functions. That is, first data storage unit 110 serves the same functions as a conventional NAS and performs a process of storing and saving data to be deposited that have been uploaded from a terminal device and performs a process of downloading data to be withdrawn to a terminal device when requested from the terminal device. Meanwhile, though second data storage unit 120 performs a process of temporarily storing data to be deposited that have been uploaded from a terminal device, the data to be deposited that are temporarily stored here are thereafter forwarded immediately via second network N2 to any of external storage sites 210, 220, and 230 and transferred thereto. Put in another way, second data storage unit 120 has just a function of temporarily storing data until the data are transferred and rather than being a data storage site, is a component that functions as a temporary working area.

Since the data that are thus subject to the data deposition process with respect to second data storage unit 120 are actually not stored inside second data storage unit 120 but are stored in an external storage site, when a request for the data withdrawal process is made from a terminal device, a process of forwarding the data from the external storage site to second data storage unit 120 via second network N2 and then downloading the data to the terminal device must be performed.

Data transferring unit 130 is a component having the function of performing such a process of forwarding and transferring data to be deposited, which exist inside second data storage 120, to external storage sites 210, 220, and 230 via second network N2 and a process of oppositely forwarding data to be withdrawn, which had been transferred to external storage sites 210, 220, and 230, into second data storage unit 120 via second network N2. In actuality, this data transferring unit 130 is a component that is realized by a program installed in a computer making up data storage device 100. For the sake of description in the present Description, the task of forwarding and transferring data from second data storage unit 120 to any of external storage sites 210, 220, and 230 shall be referred to as the "data stocking process," and the task of oppositely forwarding data from any of external storage sites 210, 220, and 230 to second data storage unit 120 shall be referred to as the "data delivery process."

A second characteristic of this invention's data storage system is that terminal devices 10 and 20 respectively have removable storage media 11 and 21 attached thereto and storing means 12 and 22 incorporated therein. Though removable storage media 11 and 21 may be any form of media as long as they are removable media that can be attached to terminal devices 10 and 20, which are personal computers, etc., here, IC cards, which are the most general form of storage media, are used. Meanwhile, the actual entities of storing means 12 and 22 are programs (in general, programs that belong to a class called agent programs) for making terminal devices execute storing processes (the data deposition process and the data withdrawal process) that shall be described below and are actually used upon installing in personal computers, etc. As shall be described later, management information, prepared by the data deposition process, is stored in removable storage media 11 and 21 and the data withdrawal process is executed by using the management information.

This invention's data storage system is thus realized by data storage devices connected to the respective terminal devices via first network N1 and removable storage media (such as IC cards) and storing means (agent programs) that are provided according to each individual terminal device.

The specific functions of storing means 12, arranged by an agent program, shall now be described (the functions of storing means 22 are the same). The basic functions of storing means 12 are to execute the data deposition process and the data withdrawal process. That is, storing means 12 has a function of performing, based on an instruction from an operator operating terminal device 10, the data deposition process of uploading data to be deposited, which are inside terminal device 10, to data storage device 100 via first network N1. It also has a function of performing, based on an instruction from the operator, the data withdrawal process of downloading data to be withdrawn (data that had been subject to the deposition process as data to be deposited in the past) from data storage device 100 via first network N1.

An important point here is that storing means 12 has a function of uploading data to be deposited into one of either first data storage unit 110 or second data storage unit 120 in accordance with the operator's selection in performing the data deposition process. Put in another way, in depositing the data, used in terminal device 10, into data storage device 100, the operator operating terminal device 10 can select between depositing the data into first storage unit 110 or into second storage unit 120, and storing means 12 uploads the data to be deposited into one of either first data storage unit 110 or second data storage unit 120 in accordance with this operator's selection. Though the data withdrawal process is also performed from one of either first data storage unit 110 or second data storage unit 120, since data deposited in first data storage unit 110 must be withdrawn from first data storage unit 110 and data deposited in second data storage unit 120 must be withdrawn from second data storage unit 120, there is no room for selection in this case.

When in performing the data deposition process, the operator selects second data storage unit 120, management information is sent from data storage device 100 as an execution result of this data deposition process. Here, storing means 12 performs a process of storing the management information as "management information concerning the data to be deposited" in removable storage medium 11. Also, in executing the data withdrawal process on data deposited in second data storage unit 120, storing means 12 performs a process of sending "management information concerning the data to be withdrawn," which had been stored in removable storage medium 11, to data storage device 100.

The data storage process and transfer process that are carried out at data storage device 100 shall now be described specifically. As mentioned above, first data storage unit 110 is a storage site having functions equivalent to those of a conventional NAS and the data to be deposited that have been uploaded here by the data deposition process at the terminal device 10 are stored and saved as they are. The data stored in first data storage unit 110 can thus be downloaded if necessary to terminal device 10 by the data withdrawal process.

Meanwhile, second data storage unit 120 is, as mentioned above, a special data storage unit that is characteristic of this invention and serves the function of a temporary data storage site for receiving and then transferring data to an external storage site. The process of receiving and transferring data to the external storage site is executed by data transferring unit 130.

That is, when data to be deposited are uploaded to second data storage unit 120 by the data deposition process, data transferring unit 130 forwards the data to be deposited from data storage device 100 to any of external storage sites 210, 220, and 230 accessible via second network N2, and thereafter deletes the data to be deposited that were stored in second data storage unit 120, prepares management information that includes information specifying the external storage site that is the forwarding destination of the data, and sends the management information to the "terminal device that is in the process of executing the data deposition process" (here, this series of processes shall be referred to as the "data stocking process").

The case where the data deposition process, with which a data file D inside terminal device 10 is the data to be deposited, is performed and this data file D is uploaded to second data storage unit 120 shall now be described with a specific example. In this case, data transferring unit 130 performs a process of determining the external storage site that is to be the transfer destination of data file D. This determination of the external storage site may be carried out automatically by a predetermined algorithm. For example, the determination may be made in accordance with a predetermined order or may be made randomly. Though for the sake of description, only the three storage sites of external storage sites 210, 220, and 230 are illustrated in FIG. 1, since as mentioned above, the internet is used for practical purposes as second network N2, an external storage site may be any storage site on the internet. An innumerable number of storage sites thus exist around the globe as the external storage sites. Data transferring unit 130 may be made to prepare a list of storage sites, which, among the innumerable storage sites existing on the internet, can actually be used based on business contracts, etc., and enabled to automatically select a predetermined storage site from this list.

Here, for the sake of description, suppose that the illustrated external storage site 210 has been selected automatically. Data file D, which has been uploaded into second data storage unit 120, is then forwarded and transferred via second network N2 to external storage site 210. At this point, data file D inside second storage unit 120 is deleted. And by data transferring unit 130, management information, including information specifying external storage site 210 that is the forwarding destination of data file D, is prepared. Though any information may be used as the information specifying external storage site 210, in the case where the internet is used as second network N2, the use of the URL of the storage site is preferable. Since a URL functions as a unique code that indicates a specific storage site on the internet, it is optimal for use as the code for specifying an external storage site in this invention.

For the sake of description, the URL of external storage site 210, to which data file D has been forwarded, shall be indicated as "URL(210)." Data transferring unit 130 prepares management information that includes the code of this "URL (210)" as the management information concerning data file D (as shall be described below, the management information may also include various information besides information specifying the storage site that is the transfer destination). The management information is then sent to terminal device 10, which executed the data deposition process concerning data file D. As described above, storing means 12 performs the process of storing the management information, which has thus been sent, as the management information concerning data file D (the data to be deposited) in removable storage medium 11. The management information is thus information that functions, so to speak, as a deposit slip for data file D.

A process of withdrawing data file D, which has thus been stored in external storage site 210, to terminal device 10 shall now be described. This process is realized by the data delivery process performed by data transferring unit 130. That is, when by the data withdrawal process at terminal device 10, a request is made to download data file D to be withdrawn from second data storage unit 120, since data file D does not exist in second data storage unit 120 at that point, data file D, which is stored in external storage site 210, must be forwarded via second network N2 to second data storage unit 120.

Data transferring unit 130 thus first receives the sending of the management information concerning data file D, which is the data to be withdrawn, from terminal device 10 that is executing the data withdrawal process. As described above, storing means 12 has the function of sending the "management information concerning the data to be withdrawn" that are stored in removable storage medium 11 in executing the data withdrawal process with respect to second data storage unit 120, and in the case of the above example, management information, including the code, "URL(210)," are sent to data storage device 100. Data transferring unit 130 receives the management information, forwards to second data storage unit 120 the data, stored in the external storage site specified by the received management information, in other words, external storage site 210, which is specified by the information, "URL(210)," and upon making the data in second data storage unit 120 be downloaded, deletes the data (this series of processes is referred to here as the "data delivery process").

Terminal device 10, which had requested the data withdrawal process with respect to data file D, is thus enabled to download the requested data file D from second data storage unit 120. Upon completion of downloading, data file D, which had been stored temporarily in second data storage unit 120, is deleted. In the case of the above example, data file D, which was stored in external storage site 210, is basically maintained in the state of being stored as it is even after the data withdrawal process from terminal device 10 has been executed. The data withdrawal process can thus be executed any number of times on data file D if necessary. If data file D, stored in external storage site 210, is to be deleted, a deletion instruction with respect to data file D that accompanies the management information including the code, "URL(210)," is sent from terminal device 10 to data storage device 100. Upon receiving such a deletion instruction, data transferring unit 130 executes a process of deleting data file D stored in external storage site 210.

In any case, data file D that is to be stored will not be stored over a long period inside second data storage unit 120. Thus on the premise that the storage capacity of the external storage sites is limitless (such a premise will hold practically if the internet is used as second network N2), the storage capacity of second data storage unit 120 will also be practically limitless. Also, since data will not actually be saved in second data storage unit 120, even if data to be stored are infected by a computer virus, data storage device 100 itself will not receive damage due to the effects of this virus. Thus with this invention's data storage system, the limits of storage capacity can be overcome and yet damages due to computer viruses can be suppressed.

Preferably for practical purposes, after completing the data stocking process or the data delivery process, data transferring unit 130 is made to perform a process of deleting the management information, used in the completed process, from inside data storage device 100. Since the management information is data necessary for performing the data stocking process or the data delivery process on specific data, after completion of the process, the information is unnecessary and do not present a problem even if deleted. By deleting the unnecessary management information from inside data storage device 100, the storage capacity inside data storage device 100 can be saved and deletion is also preferable in terms of ensuring security. As mentioned above, the management information is information that functions as a deposit slip for data to be stored and is information that indicates the actual storage site of the data. Thus in terms of security, it is not preferable for the management information to remain in data storage device 100. By arranging so that the unnecessary management information in data storage device 100 will be deleted, the management information will be stored only inside removable storage medium 11 and executing of the data withdrawal process by illicit means can be prevented.

By noting that the management information stored in removable storage medium 11 function as a deposit slip for the data to be stored, it can be understood that as long as this deposit slip is held, the withdrawal of data file D is enabled from any arbitrary terminal device. An IC card or other removable storage medium is indeed used with a personal computer or other terminal device in this invention to provide such a merit.

For example, if an operator A performed a task of uploading data file D into second data storage unit 120 by the data deposition process using terminal device 10, this data file D will actually be transferred, for example, to external storage site 210 as described above and the management information, including the code, "URL(210)," will be stored in removable storage medium 11. The important point here is that what is necessary for withdrawing data file D is not terminal device 10, on which the deposition process was carried out, but is removable storage medium 11, in which the management information is stored. That is, by removing removable storage medium 11 from terminal device 10 and installing it onto another terminal device 20, operator A is enabled to withdraw data file D using terminal device 20.

As a matter of course, since data stored in first data storage unit 110 can be accessed from any terminal device connected to first network N1 as long as a valid access right is held, such data deposited by terminal device 10 can be drawn out from another terminal device 20. However, in regard to data stored in second storage unit 120, access is not enabled regardless of having or not having access rights as long as the management information stored in removable storage medium 11 is not provided. In regard to this point, data deposited in second data storage unit 120 are stored with a higher degree of security than data deposited in first data storage unit 110.

As mentioned above, in depositing data in a terminal device into data storage device 100, an operator can select between uploading to first data storage unit 110 and uploading to second data storage unit 120. This selection can be made in considering the following merits and demerits of the respective storage units. That is, the merits of second data storage unit 120 are that the storage capacity is practically limitless, damages due to computer viruses are suppressed, and an advanced security is ensured by the need for a removable storage medium for the data withdrawal process. Oppositely, the lack of these merits is a demerit of first data storage unit 110.

Meanwhile, a merit of first data storage unit 110 is that the data deposition process and the data withdrawal process can be performed at high speed, and a demerit of second data storage unit 120 is that these processes are time consuming. As mentioned above, first data storage unit 110 corresponds to being a conventional NAS and for an operator, operating terminal device 10, it can be handled as an external storage device with an operability equivalent to a storage device that is built into terminal device 10. On the other hand, second data storage unit 120 cannot be required realistically to have an operability of such degree. In particular, when the internet is used as second network N2, the time until completion of the data forwarding process will vary according to the ever-changing traffic on the net. There will thus be some time lag between the point at which an operator performs the data deposition process operation or the data withdrawal process operation and the point at which the actual process is completed.

An operator can thus suitably choose between using the respective data storage units 110 and 120 based on a judgment of selecting second data storage unit 120 for data of a large volume that are preferably not subject to memory capacity restrictions, for data that can be infected by a virus, and for data for which a more advanced degree of security is required, and selecting first data storage unit 110 for data requiring a high-speed storage operation.

<<<Section 2. Modification Examples>>>

A basic embodiment has been described above with reference to the block diagram of FIG. 1. Embodiments that are modification examples of this invention shall now be described.

(1) As mentioned above, when the data deposition process is performed on second data storage unit 120, a short time lag will arise until the process is completed. Thus preferably for practical use, a function is provided whereby, after the data stocking process by data transferring unit 130 is completed, an e-mail indicating that the storage of the data to be deposited has been completed is sent to the terminal device. When the data to be deposited are uploaded to second storage unit 120, an operator is notified by the e-mail that the storage of the data (that is, the transfer to an external storage site) has been completed definitely.

(2) With the above-described embodiment, an example was described wherein the storage site, which is to be the forwarding destination of the data to be deposited that were uploaded to second data storage unit 120, is determined automatically by data transferring unit 130 based on a predetermined algorithm. However, if designation of an external storage site is enabled when storing means 12 performs the data deposition process by uploading the data to be deposited to second data storage unit 120, data transferring unit 130 will be enabled to forward the data to be deposited to this designated storage site.

Such operation is convenient when a single set of data is to be used in a shared manner in cooperative work by a plurality of operators. For example, if it is agreed in advance that data file D shall always be stored in external storage site 210 and management information including the code, "URL(210)" is stored in both removable storage media 11 and 21 shown in FIG. 1, an operator A, operating terminal device 10, and an operator B, operating terminal device 20, can perform data renewal work in a shared manner on the same data file D.

For example, when operator A executes some form of data renewal process on data file D and then in uploading the data file to second data storage unit 120, designates the storage site by means of the management information that include the code, "URL(210)," data transferring unit 130 will execute the data stocking process of storing this data file D in external storage site 210. Operator B can thus download this data file D to terminal device 20 and execute a further data renewal process. By thus constantly designating the same storage site as the transfer site, just the contents of the stored data can be renewed successively, and cases where cooperative work by a plurality of operators is performed on the same data can thus be accommodated.

(3) In cases of performing a task of storing desired data from a personal computer or other terminal device, the operability will be improved extremely if the data deposition process and the data withdrawal process can be executed in the form of putting and taking data in and out of a folder. Thus for practical use, it is preferable for storing means 12 to be provided with a function of displaying first data storage unit 110 and second data storage unit 120 as folders on a display screen of terminal device 10 and arranged so that the data deposition process or the data withdrawal process is performed based on instruction operations, provided from an operator, for moving data to a folder or from a folder.

Figure 2:
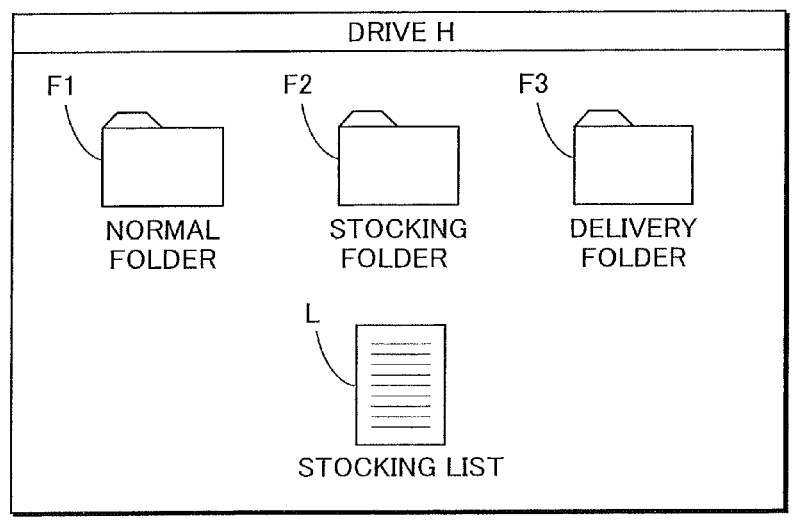
FIG. 2 is a plan view showing an example wherein a first data storage unit 110 and a second data storage unit 120, shown in FIG. 1, are respectively displayed as folders on a display screen.

FIG. 2 is a plan view showing an example wherein first data storage unit 110 and second data storage unit 120 are respectively displayed as folders on a display screen. With this example, data storage device 100 itself is set to be recognized as the external storage device, "drive H," that is supposed to be connected to terminal device 10, which is arranged from a personal computer. The operator can thus perform the data deposition process and the data withdrawal process with respect to data storage device 100 as operations of putting and taking data in and out of drive H. FIG. 2 shows a state wherein the contents of drive H are displayed on a window.

As illustrated, inside drive H are stored the three type of folders called a normal folder F1, a stocking folder F2, and a delivery folder F3 and a file called a stocking list L. Here, normal folder F1 is a folder corresponding to first data storage unit 110 and stocking folder F2 and delivery folder F3 are folders corresponding to second data storage unit 120. Second data storage unit 120 is divided into the two folders of stocking folder F2 and delivery folder F3 in order to make the operator recognize clearly that the data stocking process and the data delivery process are to be executed.

To deposit data into first data storage unit 110, the operator performs an operation of moving the file of the data to be deposited to normal folder F1 by a drag-and-drop operation. By this operation, storing means 12 is made to execute the process of uploading the data to be deposited to first data storage unit 110. Data that have thus been stored in first data storage unit 110 are displayed, upon opening of normal folder F1, as a file on the screen of terminal device 10. Thus to withdraw data from first data storage unit 110, an operation of moving the file of the data to be withdrawn, displayed inside normal folder F1, by a drag-and-drop operation to an arbitrary location inside terminal device 10 is performed. By this operation, storing means 12 is made to execute the process of downloading the data to be withdrawn from first data storage unit 110.

To deposit data in second data storage unit 120, an operation of moving the file of the data to be deposited to stocking folder F2 by a drag-and-drop operation is performed. By this operation, storing means 12 is made to execute the process of uploading the data to be deposited to second data storage unit 120. Though the data thus stored in second data storage unit 120 will be put temporarily in the state of being stored in stocking folder F2, as mentioned above, when the data stocking process by data transferring unit 130 is executed, the data are deleted from inside stocking folder F2.

Oppositely, to withdraw data from second data storage unit 120, first, data transferring unit 130 must be made to execute the work of forwarding the data to be withdrawn from the external storage site to delivery folder F3 by the data delivery process to put the data to be withdrawn in the state of being temporarily stored in delivery folder F3. The operator performs an operation of moving the file of the data to be withdrawn inside delivery folder F3 to an arbitrary location inside terminal device 10 by a drag-and-drop operation. By this operation, storing means 12 is made to execute the process of downloading the data to be withdrawn from second data storage unit 120.

Thus though inside normal folder F1, data to be stored will be put in a state of being constantly stored as a file, inside stocking folder F2 and delivery folder F3, no data will exist normally, even though data may be stored temporarily. Thus though the operator can always check the data stored in first data storage unit 110 by opening normal folder F1, the data stored in second data storage unit 120 cannot be checked by opening stocking folder F2 or delivery folder F3.

Stocking list L is thus a solution for this problem and has a function of presenting a list of data that had been subject to the data stocking process in the past. By making data transferring unit 130 serve a function of preparing and saving a list of the individual data, for which the data stocking process has been completed, as stocking list L, such as that illustrated, and present this stocking list L to a terminal device that performs the data withdrawal process, the operator is enabled to check the list of data stored in second data storage unit 120 in performing the data withdrawal process. And by making storing means 12 provide the download request, which has been made for specific data selected from stocking list L by a selection operation by the operator, to data transferring unit 130 in performing the data withdrawal process, data transferring unit 130 can receive this request and execute the data delivery process on the data to be withdrawn and store the relevant data in stocking folder F3.

In the example illustrated here, stocking list L is prepared as document data of an HTML format. The operator can thus check the contents of this stocking list L using an HTML browser software that is incorporated in terminal device 10 and can make a download request for a desired data file by clicking the relevant data filename on the list by a mouse, etc.

(4) With the examples described up until now, data to be deposited that have been uploaded to second data storage unit 120 are forwarded to a predetermined storage site by the data stocking process by data transferring unit 130. Thus for example, data file D is forwarded to external storage site 210 and stored therein. Obviously for practical use, some form of security measure is implemented whereby predetermined access rights are required to access external storage site 210 and read the stored data file D. However, in order to improve the security further, data file D is preferably divided into a plurality of partition files D1, D2, and D3 that are respectively stored individually and separately in different storage sites L1, L2, and L3 as shown in FIG. 3.

To realize such operations, data transferring unit 130 is made, in performing the data stocking process, to perform a process of dividing the data to be deposited into a plurality of partition files and forwarding the respective individual partition files to different storage sites and a process of preparing management information that specify the plurality of storage sites, and is made, in performing the data delivery process, to restore the original data by unifying the respective partition files stored in the plurality of storage sites specified by the management information and download the restored data as the data to be withdrawn.

Figure 3:
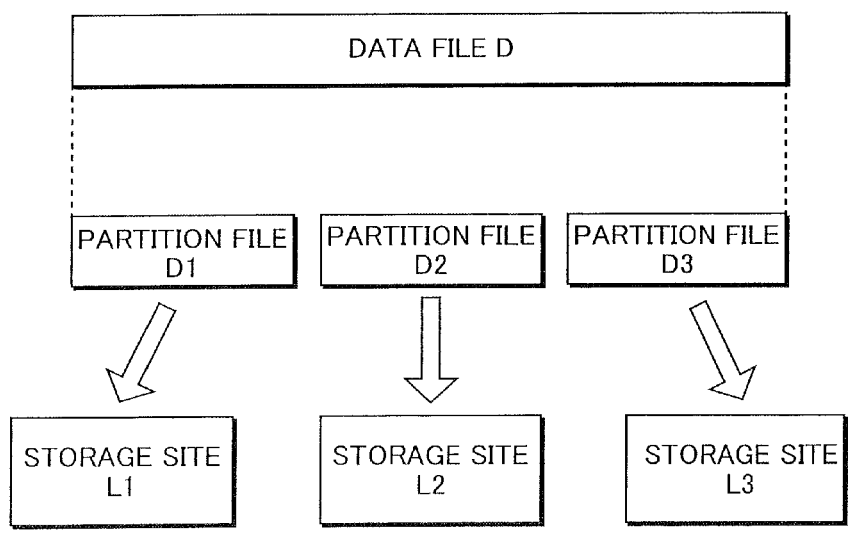
FIG. 3 is a conceptual diagram showing an example of a data file dividing process that is executed in a data transferring unit 130, shown in FIG. 1.

With the example shown in FIG. 3, since three partition files D1, D2, and D3 are transferred to external storage sites L1, L2, and L3, respectively, when the data stocking process is executed, management information that includes information indicating the three storage sites (for example, the URLs, URL(L1), URL(L2), and URL(L3), of the respective storage sites) is prepared. In executing the data delivery process, the process of unifying to the original data file D can be performed upon taking out the respective partition files D1, D2, and D3 from the respective storage sites by referencing the management information.

When a single data file is thus partitioned into a plurality of partition files that are stored in the respective storage sites, even if one of the partition files is taken out by an illicit means, since the original data file D cannot be restored by just this file, the security is improved accordingly. Though in FIG. 3, an example where a single data file D is uniformly divided into three, as in cutting a cake, is shown, the dividing of the data file does not have to be performed uniformly and a single partition file does not need to be arranged from a single batch of continuous data. For example, a form of partition is also possible wherein for a series of data bits, the odd-number bits are made to form a first partition file and the even-number bits are made to form a second partition file. By performing such partition, even when one of the partition files is obtained illicitly, since information that makes sense can hardly be recognized, security of an even higher degree can be ensured.

In general, there are innumerable methods to perform a dividing process on data file D. Thus by arranging data transferring unit 130 to employ diverse dividing methods in accordance with a predetermined algorithm or completely randomly and perform the process of preparing management information, including information indicating the dividing methods that were actually employed, in performing the data stocking process, and to execute a unifying process that is in accordance with the dividing methods included in the management information in performing the data delivery process, the security can be improved further.

For example, though the dividing method shown in FIG. 3 is a method of "dividing the original data file D into three equal portions," various dividing methods besides this can be defined, such as a dividing method of "collecting the even-number bits in a first partition file and the odd-number bits in a second partition file," a dividing method of "collecting the (4N+1)-th bits in a first partition file, the (4N+2)-th bits in a second partition file, and the (4N+3)-th bits and (4N+4)-th bits in a third partition file, where N=0, 1, 2, . . . ," etc. By making data transferring unit 130 perform such various and diverse dividing methods and making information indicating the relevant dividing methods be included in the management information, the unification process of restoring the original data file from the partition files can be executed by referencing the dividing methods included in the management information in performing the data delivery process.

In this case, the management information not only indicates the storage sites but also serves the role of information indicating restoration methods, and since without the management information, not only the storage sites but the restoration methods also cannot be known, adequate security can be ensured.

In order to improve the security further, encryption is performed in the process of storing in an external storage site. That is, data transferring unit 130 is made to perform, in performing the data stocking process, an encryption process on the data to be deposited, a process of forwarding the encrypted data in an external storage site, and a process of preparing management information including information indicating the encryption method. In performing the data delivery process, a decryption process that is in accordance with the encryption method included in the management information is executed. In this case, the management information serves the further role of information indicating the decryption method.

(5) Lastly, an example, wherein a plurality of data storage devices are provided and data stored at a predetermined storage site are enabled to be downloaded to a terminal device via an arbitrary data storage device, is shown in FIG. 4. That is, in the illustrated example, the two networks N3 and N4 of an intra-company LAN of a Tokyo headquarters and an intra-company LAN of an Osaka branch are provided. Here, these networks N3 and N4 correspond to being first network N1 shown in FIG. 1. Meanwhile, internet N5 corresponds to being second network N2 shown in FIG. 1. A data server 310 of the Tokyo headquarters is connected to network N3 and a data server 320 of the Osaka branch is connected to network N4. Here, each of data servers 310 and 320 corresponds to being data storage device 100 shown in FIG. 1. As in the example of FIG. 1, external storage sites 410, 420, and 430 are connected to internet N5. Also, though unillustrated, numerous terminal devices are connected to each of networks N3 and N4.

With this arrangement, an operator can use a terminal device connected to network N3 of the Tokyo headquarters to perform the data deposition process and the data withdrawal process with respect to an external storage site via data server 310, or can use a terminal device connected to network N4 of the Osaka branch to perform the data deposition process and the data withdrawal process with respect to an external storage site via data server 320. For example, suppose that when an employee employed in Tokyo performed deposition of a predetermined data file D via data server 310 using a terminal device connected to network N3 of the Tokyo headquarters, data file D became transferred to external storage site 410. In this case, management information specifying the storage site, such as URL(410), is stored in a removable storage medium (IC card) connected to the terminal device.

If when going to Osaka for business, this employee brings the IC card, the employee can connect the IC card to a terminal device connected to network N4 of the Osaka branch to withdraw, via data server 320, data file D that had been transferred to external storage site 410.

This invention's data storage system can thus be arranged by providing a plurality of data storage devices 100 and can also be used in an environment having a plurality of independent networks. As a matter of course, this invention can also be used in a single-network environment. That is, though in the example shown in FIG. 1, first network N1 and second network N2 are separate networks, these may be arranged from the same, common network (for example, both networks N1 and N2 can be arranged from the internet).

INDUSTRIAL APPLICABILITY

This invention can be used widely in computer network systems and is particularly optimal for use in an environment wherein data of large volumes must be stored from arbitrary terminal devices on a network into other arbitrary data storage sites.

The invention claimed is:

1. A data storage system using a network, having functions of storing data sent from a terminal device via the network in accordance with a request from the terminal device and returning saved data via a network in accordance with a request from a terminal device,
said data storage system comprising:
a removable storage medium, installable to the terminal device; storing means, built into the terminal device; and a data storage device, connected to the terminal device via a first network,
the data storage device having a first data storage unit, a second data storage unit, and a data transferring unit,
the storing means having functions of performing, based on an instruction of an operator, a data deposition process of uploading data to be deposited to the data storage device via the first network and a data withdrawal process of downloading data to be withdrawn from the data storage device via the first network, wherein, in performing the data deposition process, the data to be deposited are uploaded to one of either the first data storage unit or the second data storage unit in accordance with an operator's operation,
the first data storage unit performing a process of storing and saving the data to be deposited that have been uploaded from the terminal device and performing a process of downloading the data to be withdrawn to the terminal device when requested from the terminal device,
the second data storage unit performing a process of temporarily storing the data to be deposited that have been uploaded from the terminal device and the data to be withdrawn that will be downloaded to the terminal device,
the data transferring unit having functions of performing:
a data stocking process, whereby, when the data to be deposited have been uploaded to the second data storage unit by the data deposition process, the data to be deposited are forwarded to an external storage site, accessible from the data storage device via a second network, the data to be deposited stored in the second data storage unit are deleted, and management information, including information specifying the external storage site, is sent to the terminal device that is executing the data deposition process,
a data delivery process, whereby, when a request to download the data to be withdrawn from the second data storage unit is made by the data withdrawal process, management information is received from the terminal device that is executing the data withdrawal process, data stored in an external storage site specified by the received management information are forwarded to the second data storage unit, and the data in the second data storage unit are deleted upon being downloaded,
a process of preparing and saving a list of respective individual data for which the data stocking process has been completed and presenting the list to the terminal device that performs the data withdrawal process, and
a process of, after completion of the data stocking process or the data delivery process, deleting management information used in the completed data stocking process or data delivery process from inside the data storage device,
the storing means further having functions of executing:
a process of storing, as an execution result of the data deposition process, management information sent from the data storage device as "management information concerning the data to be deposited" into the removable storage medium,
a process of sending, in executing the data withdrawal process, "management information concerning the data to be withdrawn" that had been stored in the removable storage medium to the data storage device, and
a process of making the terminal device recognize the data storage device as an external storage device, display a normal folder which corresponds to the first data storage unit and a stocking folder and a delivery folder which correspond to the second data storage unit on a window showing contents of the external storage device, and display data stored in the respective data storage units as a file when an opening operation of the respective folders is made, and
the storing means furthermore having functions of:
(a) uploading the data to be deposited into the first data storage unit, when the operator performs an operation of moving a file of the data to be deposited to the normal folder,
(b) downloading the data to be withdrawn from the first data storage unit, when the operator performs an operation of moving a file of the data to be withdrawn from the normal folder,
(c) providing the data transferring unit with a download request for a selected data, when the operator performs an operation of selecting the specific data from the list,
(d) uploading the data to be deposited into the second data storage unit, when the operator performs an operation of moving a file of the data to be deposited to the stocking folder, and
(e) downloading the data to be withdrawn from the second data storage unit, when the operator performs an operation of moving a file of the data to be withdrawn from the delivery folder.

2. The data storage system using network according to claim 1, wherein: the data transferring unit has a function of sending, after completion of the data stocking process, an e-mail indicating, to a terminal device, completion of a storage of data to be deposited.

3. The data storage system using network according to claim 1, wherein: the storing means has a function of designating an external storage site in performing the data deposition process by uploading data to be deposited to the second data storage unit, and the data transferring unit forwards the data to be deposited to the designated external storage site.

4. The data storage system using network according to claim 1, wherein: as information for specifying an external storage site, a URL of the external storage site is used.

5. The data storage system using network according to claim 1, wherein: the data transferring unit, in performing the data stocking process, performs a process of dividing data to be deposited into a plurality of partition files and forwarding the respective individual partition files to different storage sites and a process of preparing management information that specify the plurality of storage sites, and, in performing the data delivery process, restores an original data by unifying the respective partition files stored in the plurality of storage sites specified by the management information and downloads the restored data as data to be withdrawn.

6. The data storage system using network according to claim 5, wherein: the data transferring unit, in performing the data stocking process, performs a process of preparing management information including information indicating a dividing method that is carried out, and, in performing the data delivery process, executes a unifying process that is in accordance with a method included in the management information.

7. The data storage system using network according to claim 1, wherein: the data transferring unit, in performing the data stocking process, performs an encryption process on data to be deposited, a process of forwarding encrypted data to an external storage site, and a process of preparing management information including information indicating a method of the encryption process, and, in performing the data delivery process, executes a decryption process that is in accordance with a method included in the management information.

8. The data storage system using network according to claim 1, wherein: a plurality of data storage devices are provided and data, stored in any of predetermined storage sites, are enabled to be downloaded to the terminal device via any of the plurality of data storage devices.

9. The data storage system using network according to claim 1, wherein: the storing means is realized by program installed in a computer making up the terminal device and an IC card is used as the removable storage medium.

10. The data storage system using network according to claim 1, wherein: a LAN is used as the first network and the internet is used as the second network.

11. A non-transitory computer-readable storage medium recording a program, making a computer function as the storing means or data transferring unit of the data storage system using network according to claim 1.

* * * * *